(12) United States Patent
Chang

(10) Patent No.: US 6,994,543 B2
(45) Date of Patent: Feb. 7, 2006

(54) INTERNALLY LABEL-STICKING MOLD

(76) Inventor: Huang Sheng Chang, P.O. Box 2-10, Tainan City (TW)

( * ) Notice: Subject to any disclaimer, the term of this patent is extended or adjusted under 35 U.S.C. 154(b) by 334 days.

(21) Appl. No.: 10/435,995

(22) Filed: May 8, 2003

(65) Prior Publication Data

US 2004/0224049 A1 Nov. 11, 2004

(51) Int. Cl.
*B29C 49/24* (2006.01)
*B29C 49/52* (2006.01)

(52) U.S. Cl. ............... 425/504; 425/509; 425/522; 425/538; 425/541

(58) Field of Classification Search ........... 425/503, 425/504, 509, 522, 532, 533, 538, 541; 264/509
See application file for complete search history.

(56) References Cited

U.S. PATENT DOCUMENTS

| | | | | |
|---|---|---|---|---|
| 2,989,776 A | * | 6/1961 | Strong | 264/540 |
| 3,479,421 A | * | 11/1969 | Rudolph et al. | 264/516 |
| 4,298,567 A | * | 11/1981 | Aoki | 264/516 |
| 4,303,381 A | * | 12/1981 | Aoki | 425/503 |
| 4,342,399 A | * | 8/1982 | Stirling | 215/12.2 |
| 4,501,548 A | * | 2/1985 | Jahnel | 425/503 |
| 4,696,840 A | * | 9/1987 | McCullough et al. | 229/117.3 |
| 5,759,654 A | * | 6/1998 | Cahill | 428/36.91 |

FOREIGN PATENT DOCUMENTS

| | | | |
|---|---|---|---|
| DE | 19640199 A1 | * | 4/1998 |
| JP | 01136718 A | * | 5/1989 |
| JP | 04021426 A | * | 1/1992 |
| JP | 2004196344 A | * | 1/1992 |
| JP | 2000141459 A | * | 5/2000 |

* cited by examiner

Primary Examiner—Robert B. Davis

(57) ABSTRACT

An internally label-sticking mold includes an outer mold and an inner mold. The outer mold has an interior hollow for containing a shaped material and the inner mold, and the inner mold has an interior hollow for containing a label therein. Thus, when the outer mold with the shaped material placed in its interior hollow is combined with the inner mold with the label placed in its interior hollow for blowing and molding a plastic product, the shaped material becomes a finished plastic product stuck with a label integral.

17 Claims, 20 Drawing Sheets

INTERNALLY LABEL-STICKING MOLD

FIELD OF THE INVENTION

This invention relates to an internally label-sticking mold, particularly to one consisting of an outer mold and an inner mold to blowingly mold plastic products stuck with a label during the blowingly molding process.

BACKGROUND OF THE INVENTION

Nowadays, conventional plastic products such as PET (polyethylene terephthalate) bottles are made in two methods described below.

A first method shown in FIG. 1 includes a step of injecting a shaped material, a second step of placing the shaped material into an inner hollow B0 of a mold B (shown in FIG. 2), and then air is blown in the inner hollow B0 to form a product shaped as the inner hollow B0.

A second method shown in FIG. 2 includes a step of injecting directly a material(C) in an inner hollow D0 of a mold D and then blowing air into the inner hollow D0 to form a product.

The two products (E) made in the two methods have a thermally shrinking film label (F) fitted around the outer surface of the product properly and then warmed to let the label shrink around the product (E) to order to indicate the content filled in the product such as bottles for cider, juice, mineral water, etc.

However, this kind of thermally shrinking film label (E) is frequently stored in the room temperature or a little below the room temperature, so the thermally shrinking film label (F) may become loose against a bottle to fall off, causing some embarrassment of consumers.

SUMMARY OF THE INVENTION

The purpose of the invention is to offer a mold for manufacturing plastic containers such as bottles, which can stick a label on a finished container stably so as to make a container with a label integral without need of sticking a label separately.

The features of the invention are described as follows.

1. A label is in advance placed in an inner hollow of an inner mold combined with an outer mold for blowing molding a plastic container stuck with the label, with one process to finish it integral.

2. The mold used in the invention consists of an outer mold and an inner mold, and the outer mold has an interior hollow for containing the inner mold therein, and the inner mold has an interior hollow for a label to be placed therein together with a shaped material and then the outer mold and the inner mold are combined together for blowing molding a finished plastic container stuck with the label integral.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
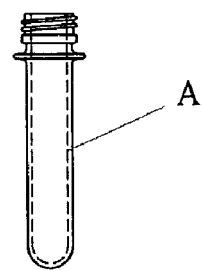
FIG. 1 is a side view of an injected shaped material.
Figure 2:
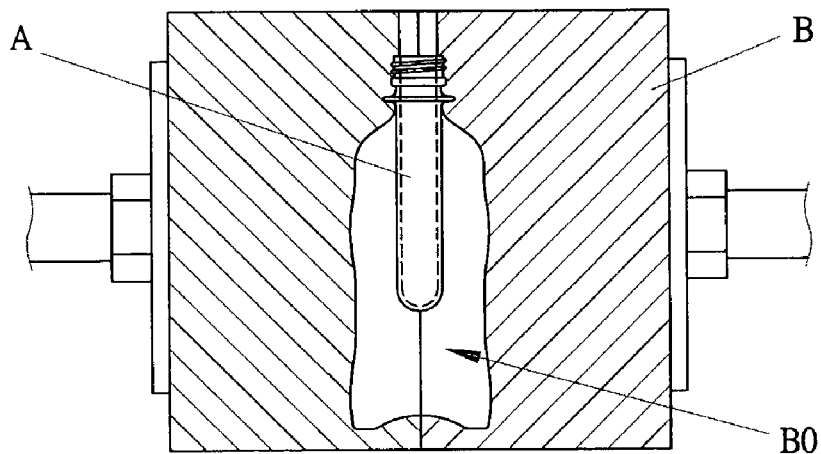
FIG. 2 is a cross-sectional view of a mold used for a first conventional method of blowing molding.
Figure 3:
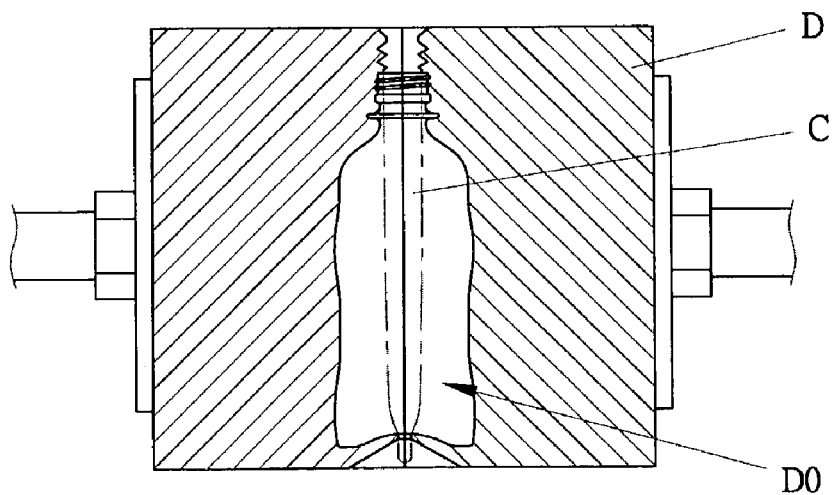
FIG. 3 is a cross-sectional view of a mold used for a second conventional method of blowing molding.
Figure 4:
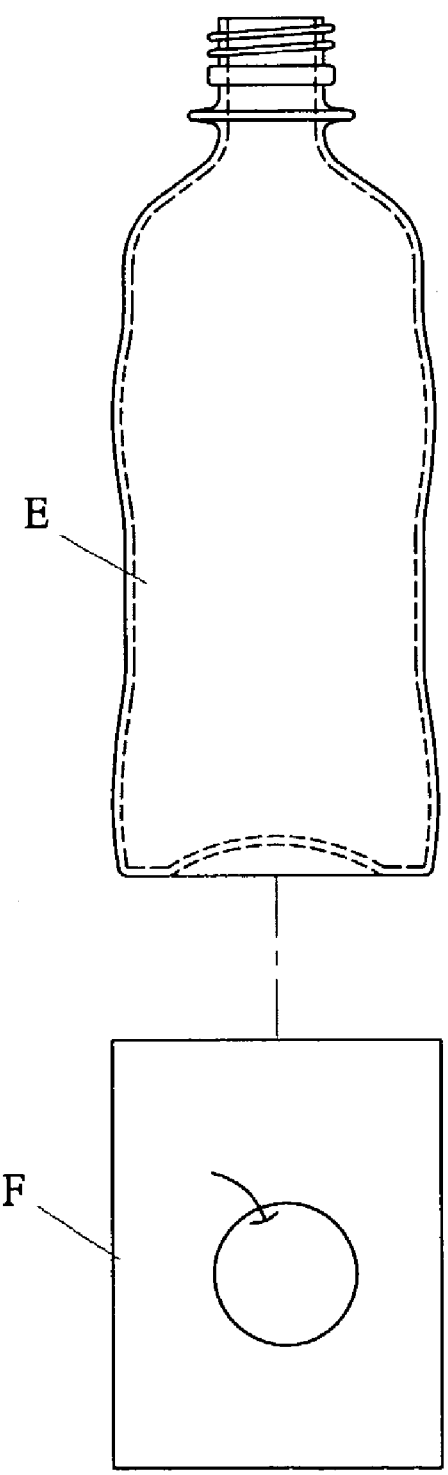
FIG. 4 is a side view of a conventional finished product and a shrinking film in the conventional blowing molding.
Figure 5:
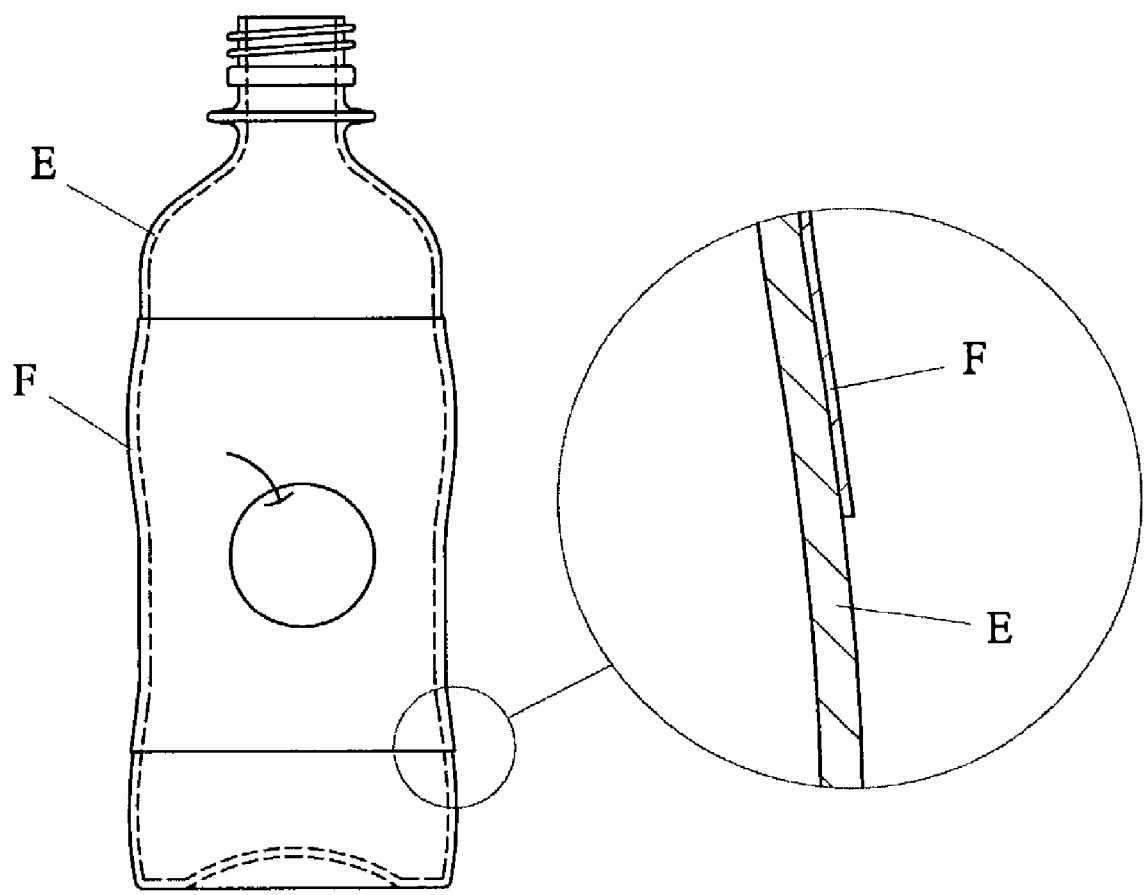
FIG. 5 is a side view of the conventional product with the shrinking film combined together.
Figure 6:
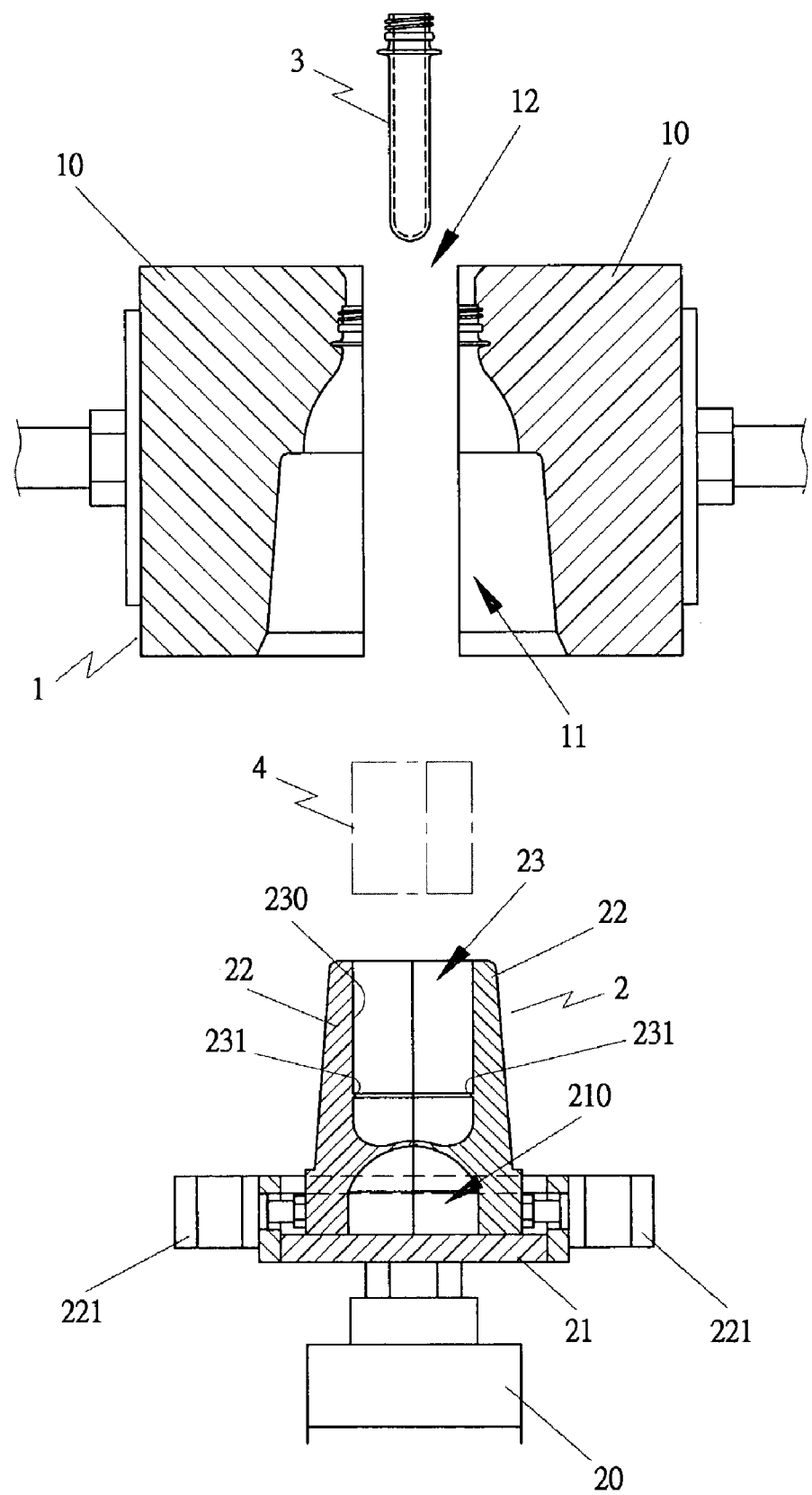
FIG. 6 is an exploded cross-sectional view of a first embodiment of an internally label-sticking mold in the present invention.

A first embodiment of an internally label-sticking mold in the present invention, as shown in FIGS. 6–11, includes an outer mold 1 and an inner mold 2. The outer mold 1 consists of plural mold blocks 10, forming an interior hollow 11 and an inlet 12 in an upper side after the plural mold blocks combined together to become the outer mold 1. Then an injected shaped material 3 is placed through the inlet 12 and into the interior hollow 11 after heated up to a proper temperature to let it soften a little, so as to be blown into a finished product 30 shown in FIG. 8.

Figure 18:
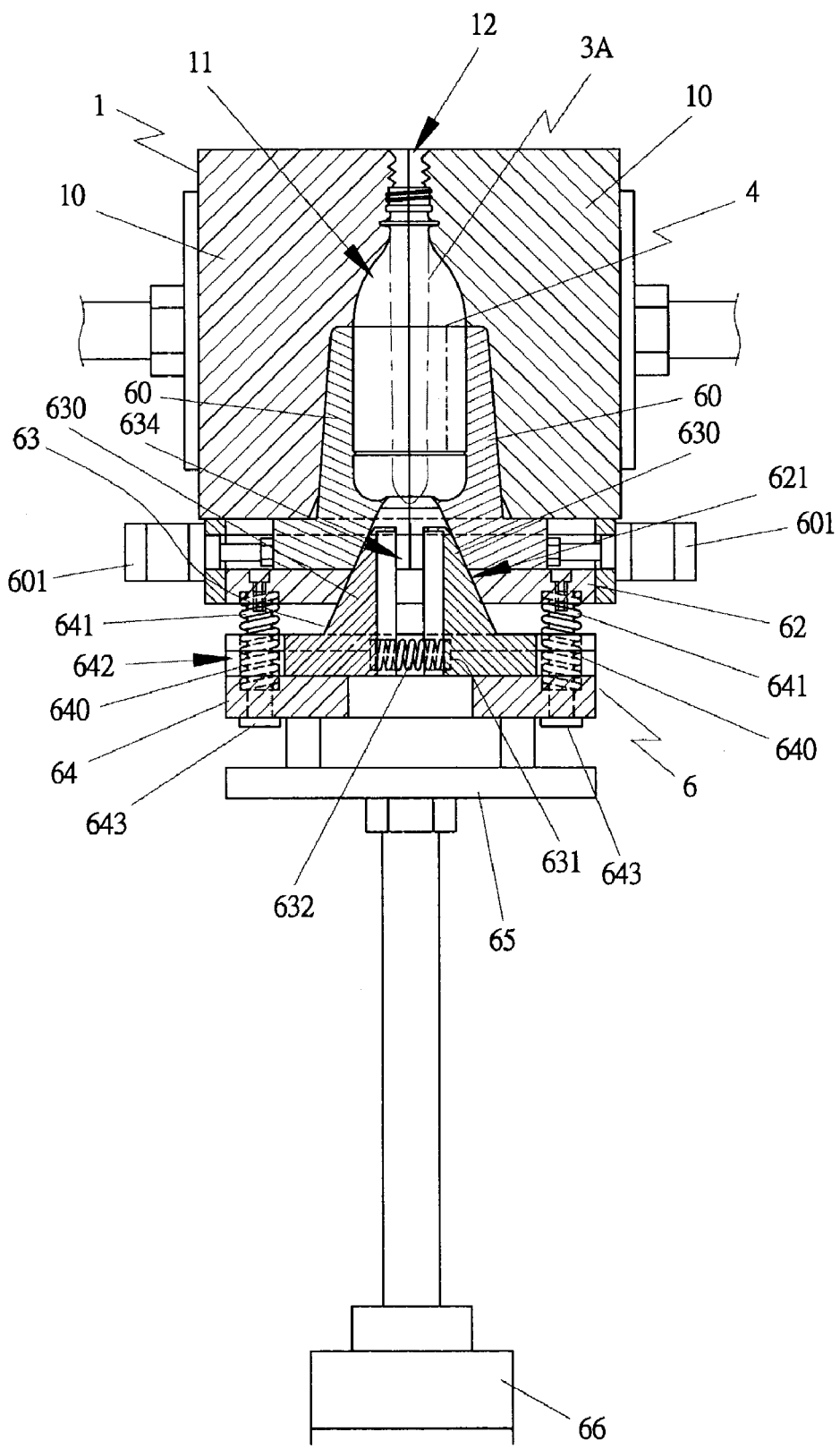
FIG. 18 is a cross-sectional view of the sixth embodiment of an internally label-sticking mold in the present invention.
Figure 19:
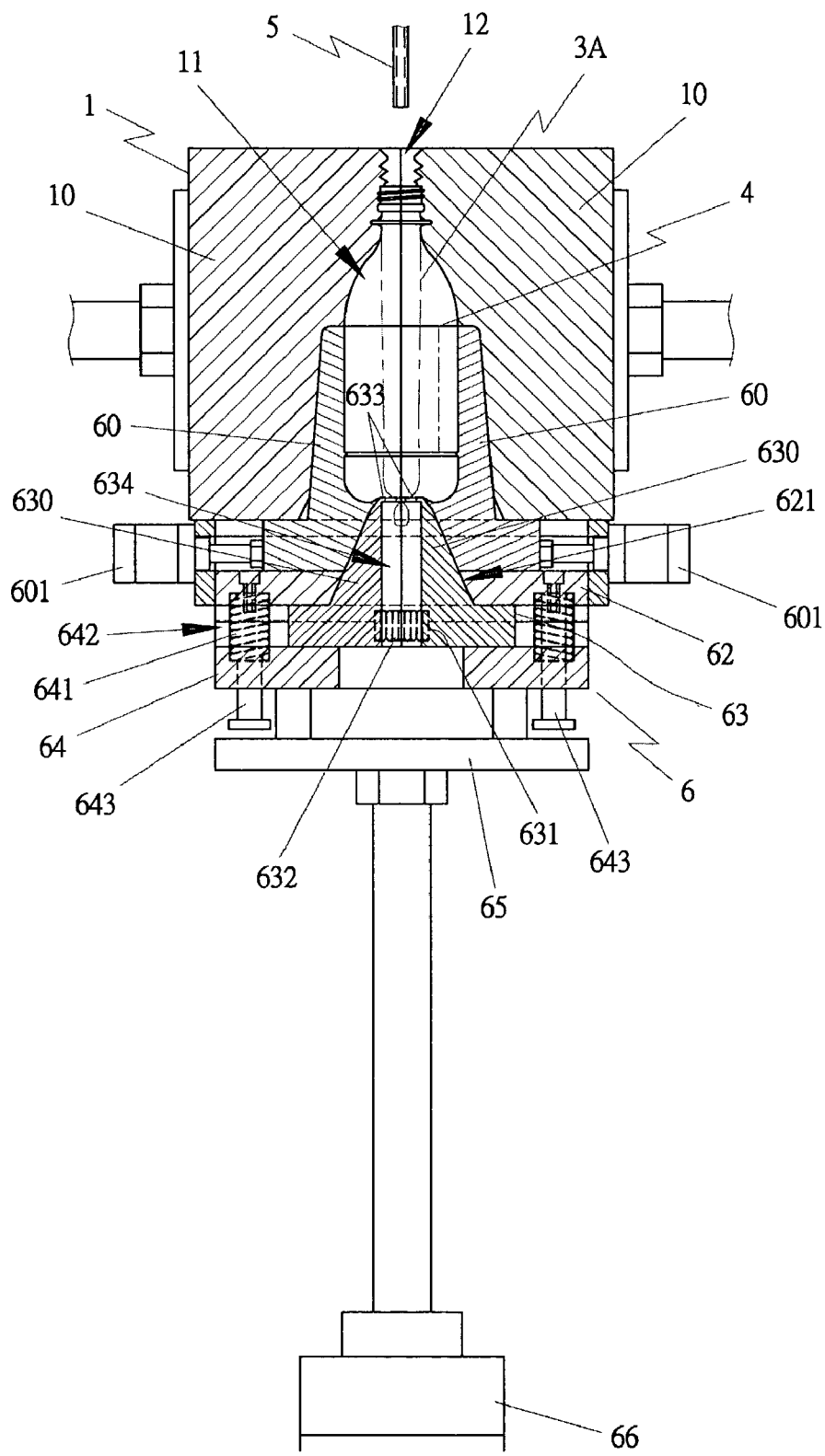
FIG. 19 is a cross-sectional view of the sixth embodiment of an internally label-sticking mold in the present invention, indicating its first movement.
Figure 20:
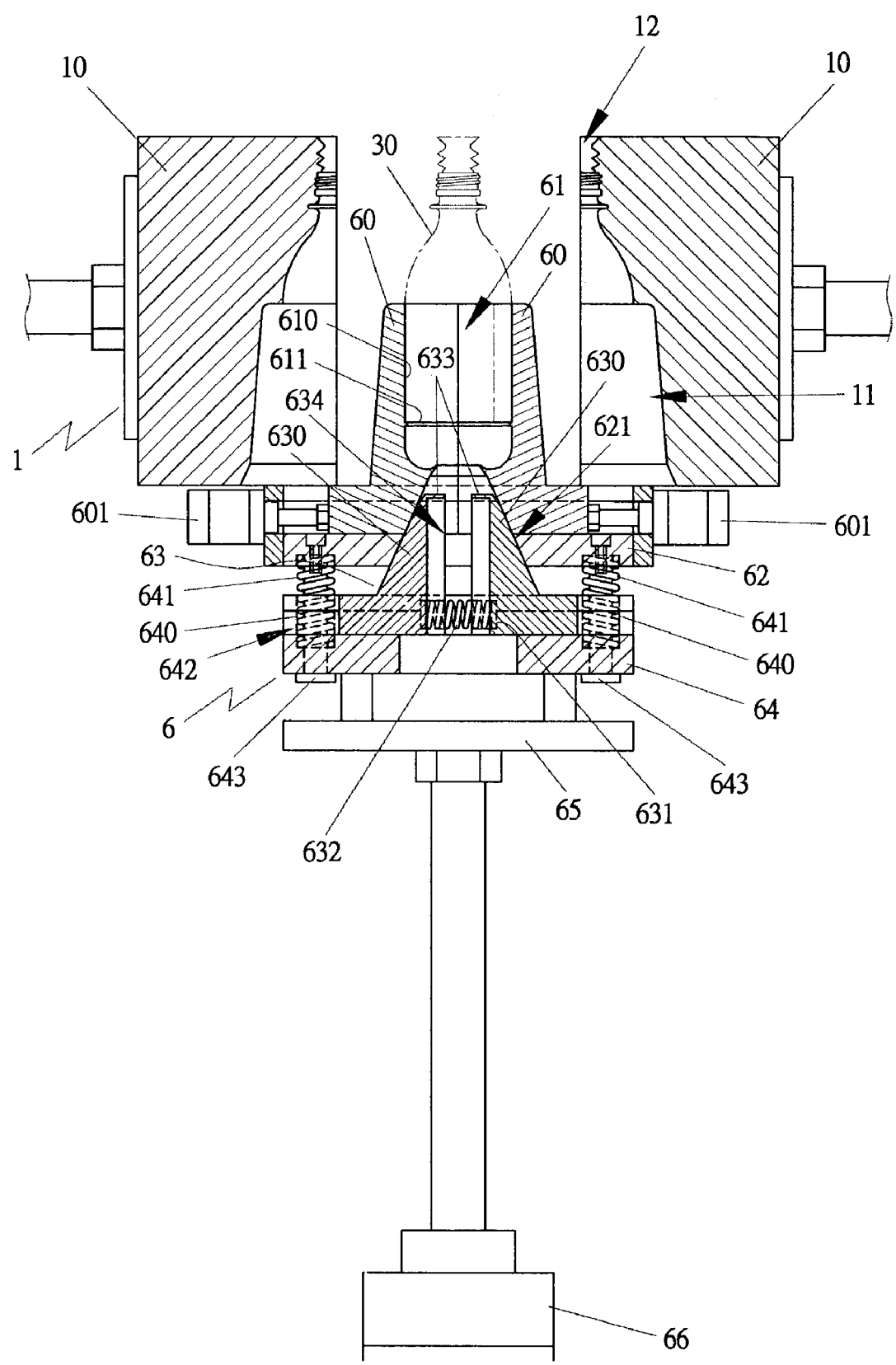
FIG. 20 is cross-sectional view of the sixth embodiment of an internally label-sticking mold in the present invention, indicating its second movement.
Figure 21:
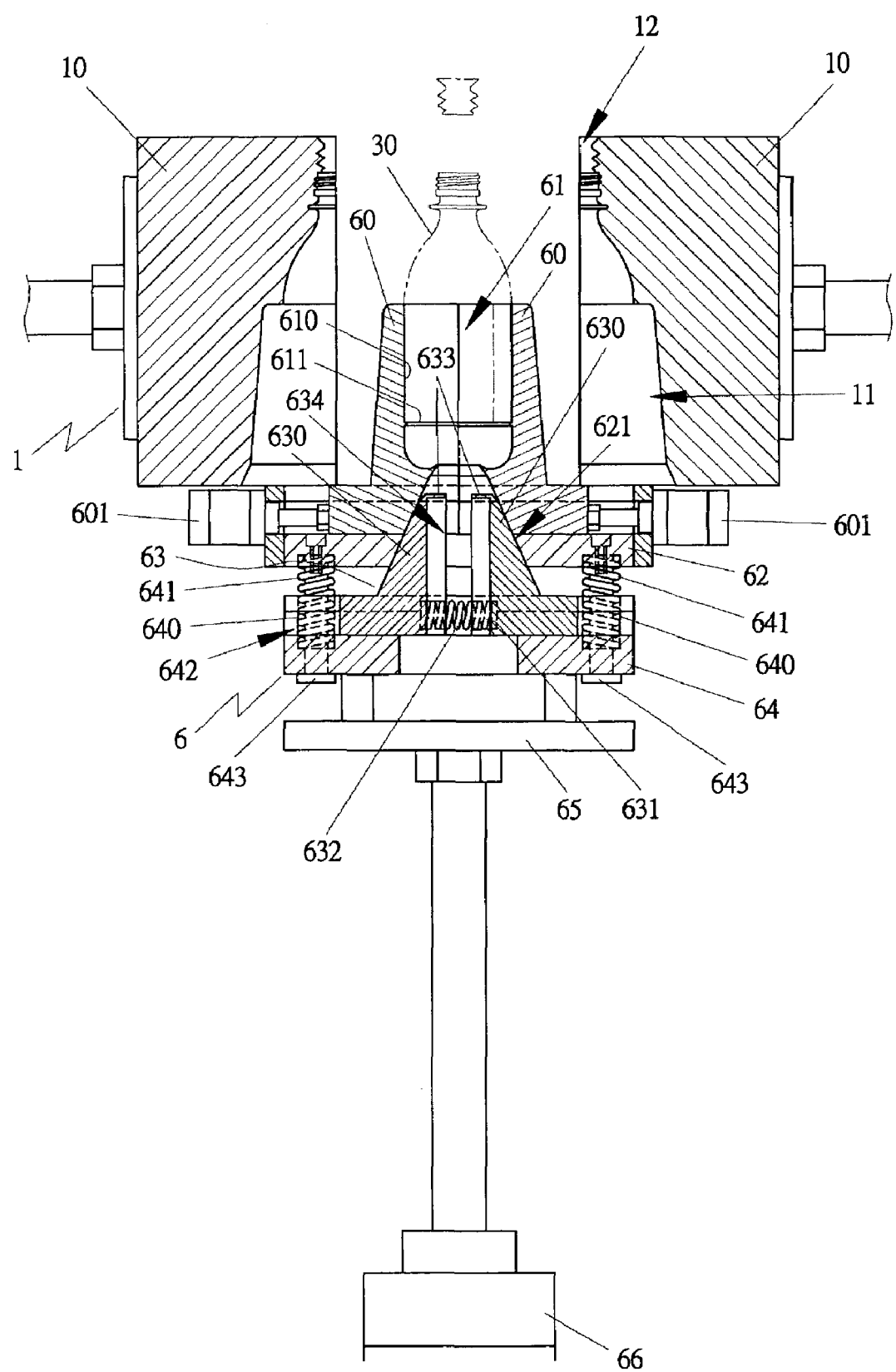
FIG. 21 is a cross-sectional view of the sixth embodiment of an internally label-sticking mold in the present invention, indicating its third movement.
Figure 22:
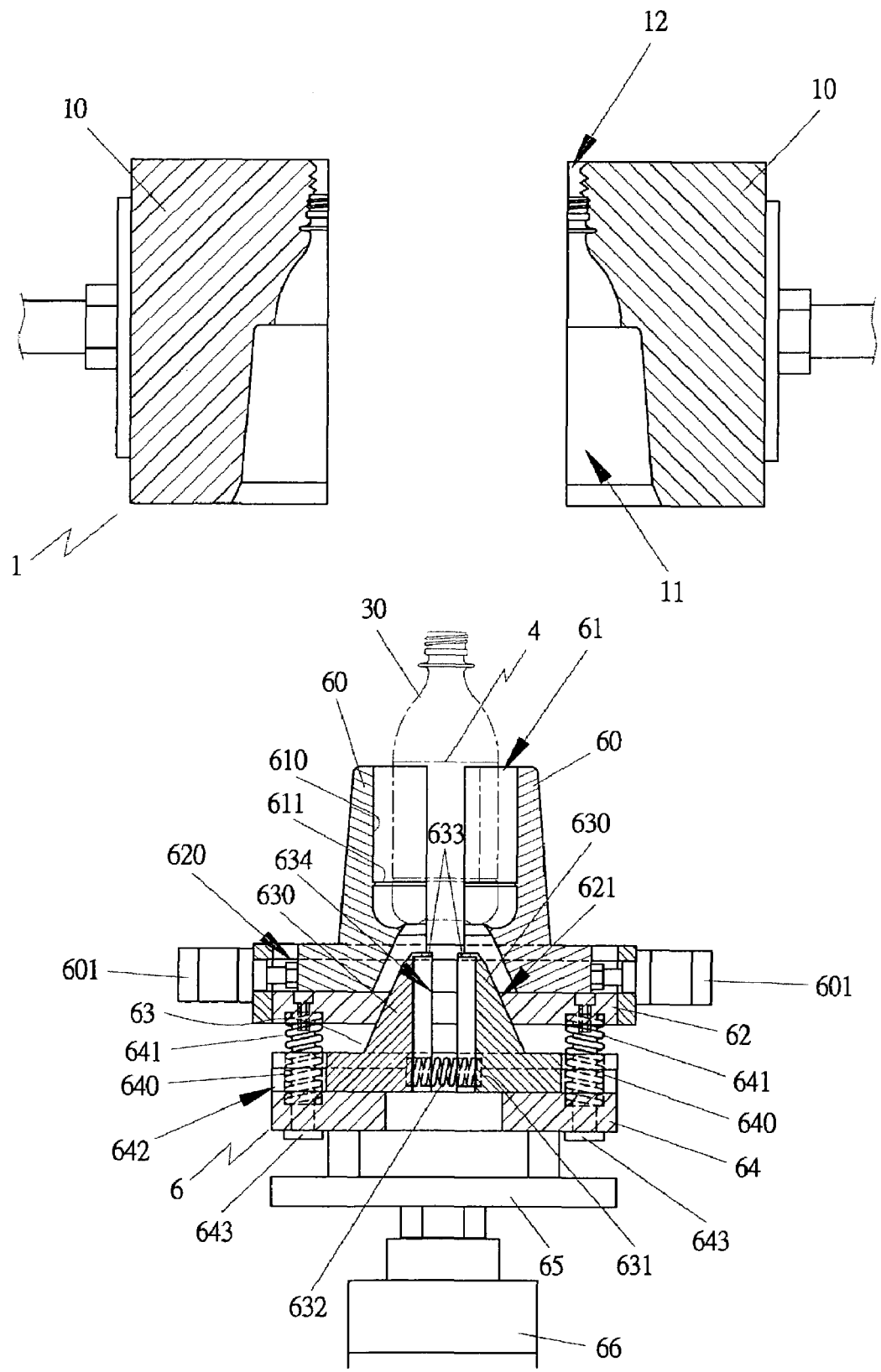
FIG. 22 is a cross-sectional view of the sixth embodiment of an internally label-sticking mold in the present invention, indicating its fourth movement.
Figure 23:
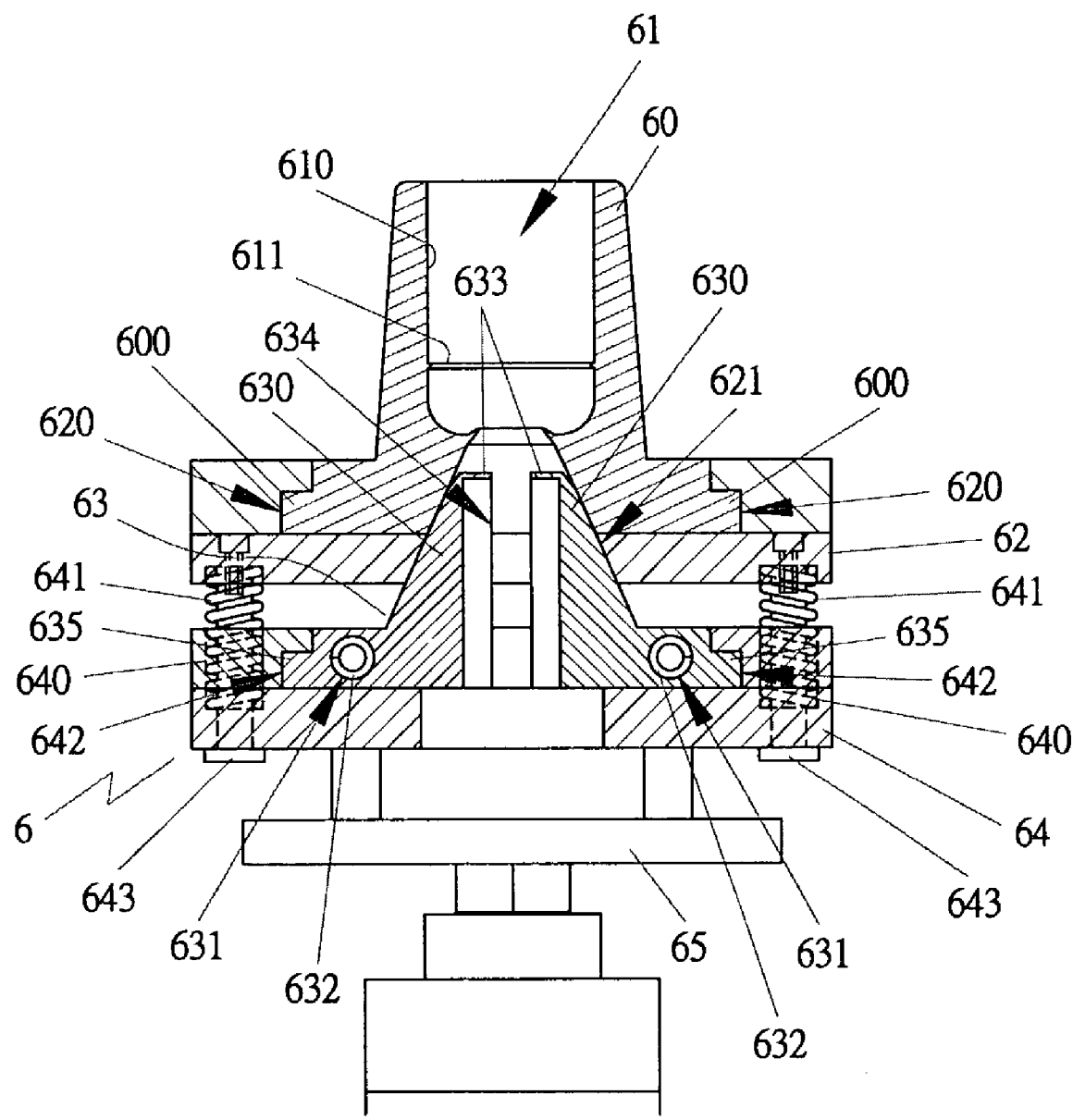
FIG. 23 is a cross-sectional view of an inner mold of the fixth embodiment of an internally label-sticking mold in the present invention.

The inner mold 6 can consist of plural mold blocks 60 for enabling various shaped finished plastic products 30 (as shown in FIGS. 18, 19 and 20) more easily taken out of the mold. A slide block member 600 is formed integral in a lower section of each mold block 60. Further a drive member 601 is provided with each mold block 60 to automatically open and close the mold blocks 60 so as to take out finished plastic products. The inner mold 6 has an interior hollow 61 shaped the same as a part of various plastic products 30 to be molded, with an annular wall 611 formed on an inner surface 610 defining the interior hollow 61 for placing a label 4 for limiting the depth of the label placed around the interior hollow 61. Further, an upper mold base 62 is provided for supporting the inner mold 6, having a slide groove 620 for the slide block member 600 of the inner mold 6 to fit with, and a groove 621 for positioning a cone-shaped clamp mold 63 consisting of plural clamp-mold blocks 630 with an outer sloped surface, and a coil spring 632 is placed between the plural clamp-mold blocks 630 for automatically opening and closing the clamp-mold blocks 630 to coordinate with automatic opening and closing movement of the inner mold 6. The upper mold base 62 further has a center hole 621 for the clamp mold 63 to fit therein so that the clamp mold 6 may open or close with a regular route. Further, the clamp mold 63 has a clamping member 633 defining a gap 634 for clamping a lower end of a shaped material 3A, as shown in FIG. 19. The plural clamp-mold blocks 630 have a slide block member 635 formed in a lower section, and a intermediate mold base 64 is provided to support the slide block members 635 of the clamp block 63, having plural holes 640 for springs 641 to extend through, and a slide groove 642 for the slide block members 635 to fit therein, and combined with the upper mold base 62 by means of vertical rods 643. Further, a lower mold base 65 is provided to support the intermediate mold base 64, firmly fixed with the intermediate mold base 64. Then another drive member 66 is provided under the lower mold base 65 to move the inner mold 6 together with the clamp mold 63 and the three mold bases 62, 64 and 65, and it may be an oil pressure cylinder, an air pressure cylinder, a threaded rod moved by a motor or by an oil pressure motor.

Figure 7:
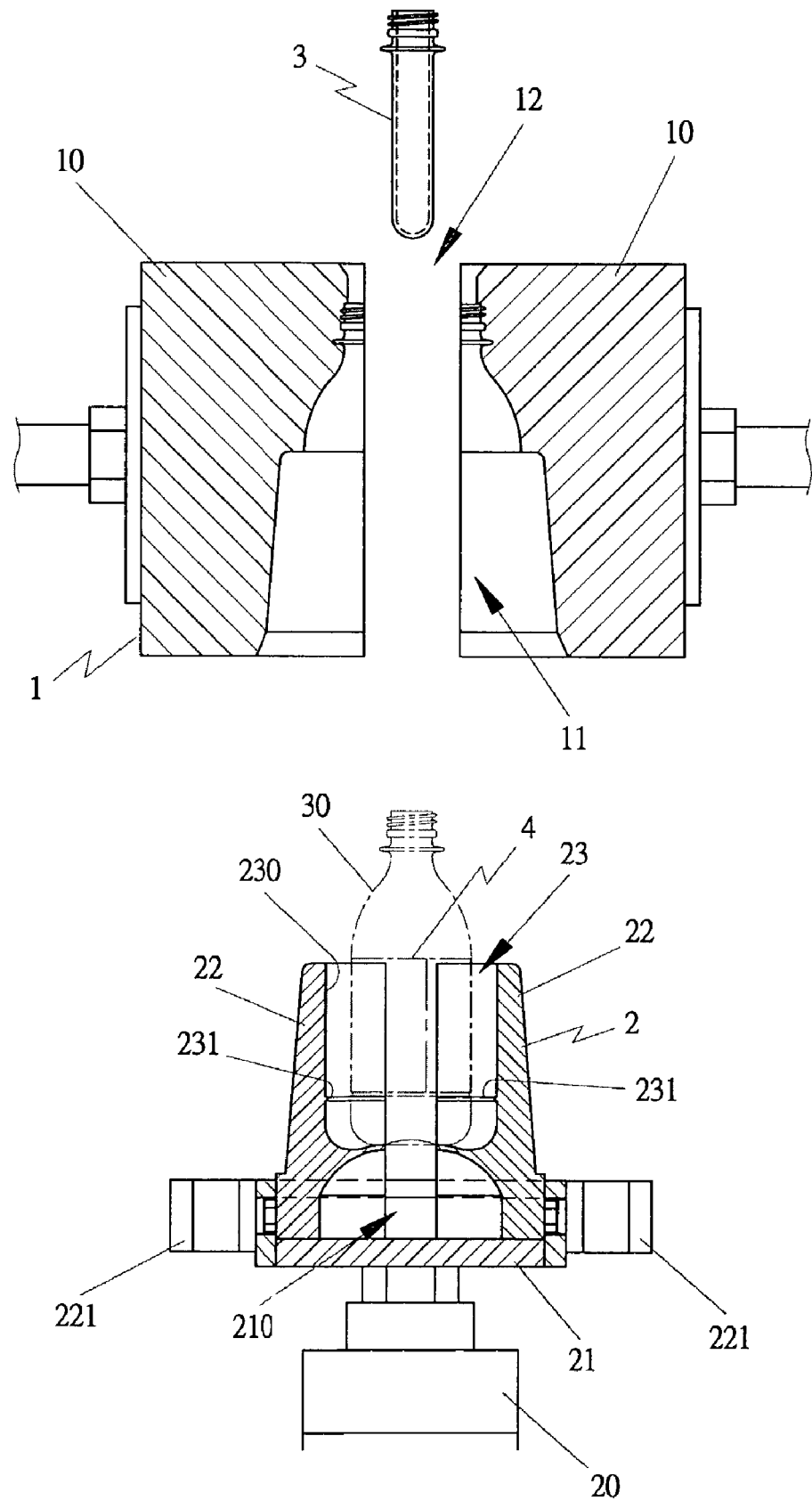
FIG. 7 is an exploded cross-sectional view of the first embodiment of an internally label-sticking mold in the present invention, indicating its movement.
Figure 8:
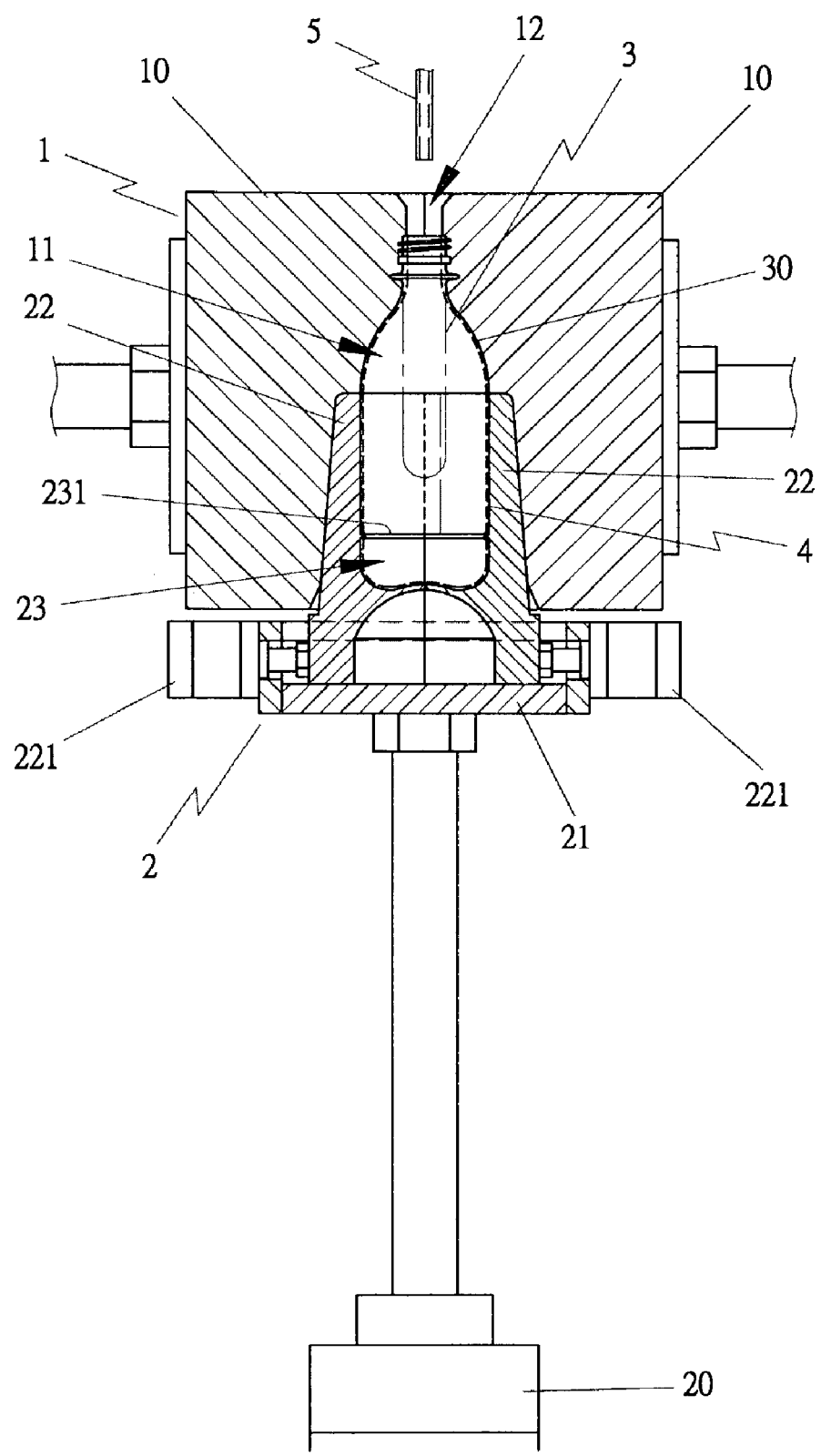
FIG. 8 is a cross-sectional view of the first embodiment of an internally label-sticking mold in the present invention.
Figure 9:
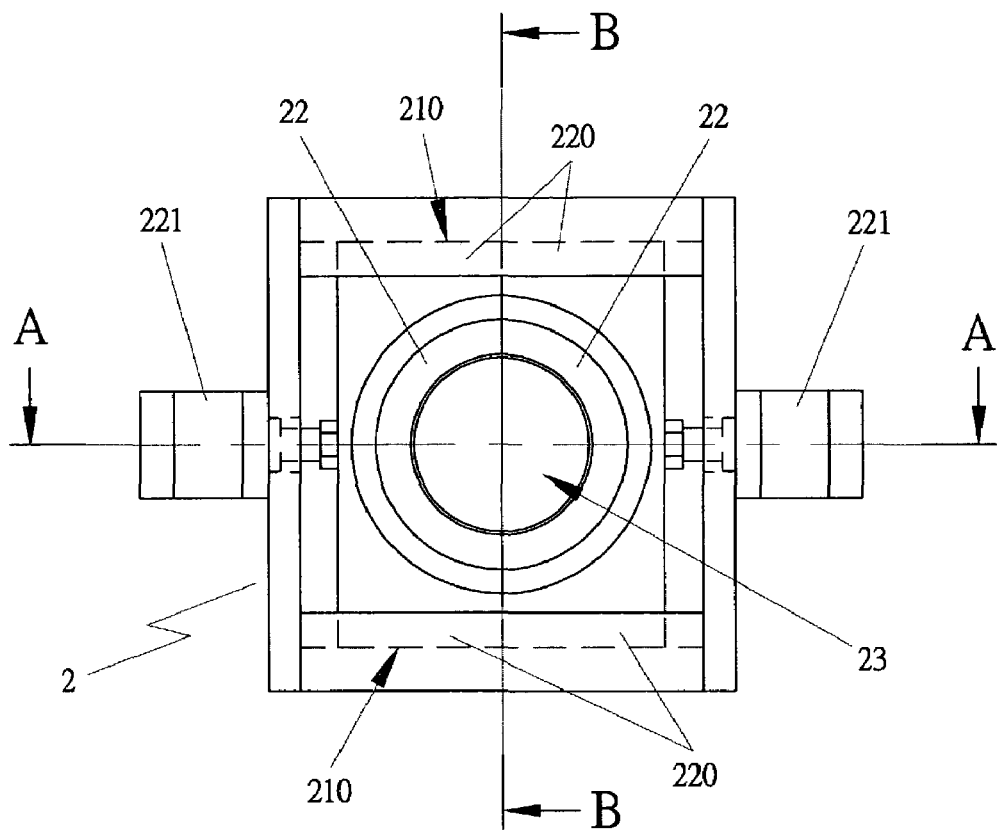
FIG. 9 is an upper view of an inner mold of the first embodiment of an internally label-sticking mold in the present invention.

In the first embodiment, the shaped material 3 is placed in the outer mold 1, with the label 4 placed, in advance in the inner hollow 23 of the inner mold 2. Then the outer mold 1 is closed, with the inner mold 2 is pushed in the interior hollow 11 of the outer mold 1 by the drive member 20 at the same time. Now air is blown in the interior hollows 11 and 23 of the outer and the inner mold 1 and 2 through an air tube 5 via the inlet 12 of the outer mold 1, inflating (or blowing) the shaped material 3 into a plastic product 30 with the label 4 stuck on the plastic product 30 as integral, as shown in FIGS. 7 and 8. After that, the inner mold 2 is separated with the outer mold 1, with the inner mold blocks 22 moved off the outer mold 1 and opened by the drive member 221 so as to let the finished plastic product 30 stuck with the label 4 taken out of the outer mold 1.

Figure 12:
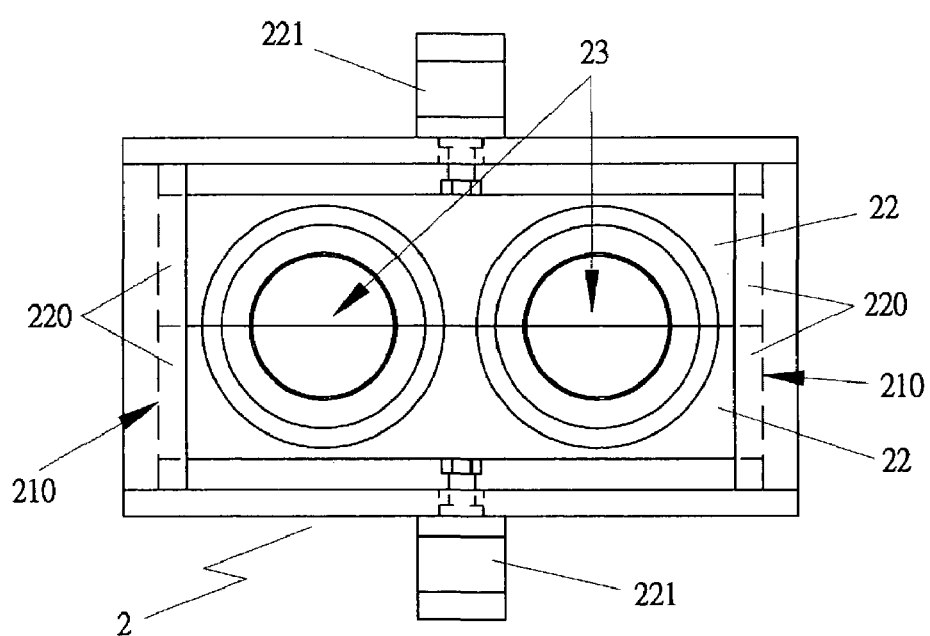
FIG. 12 is an upper view of an inner mold of a second embodiment of an internally label-sticking mold in the present invention.
Figure 10:
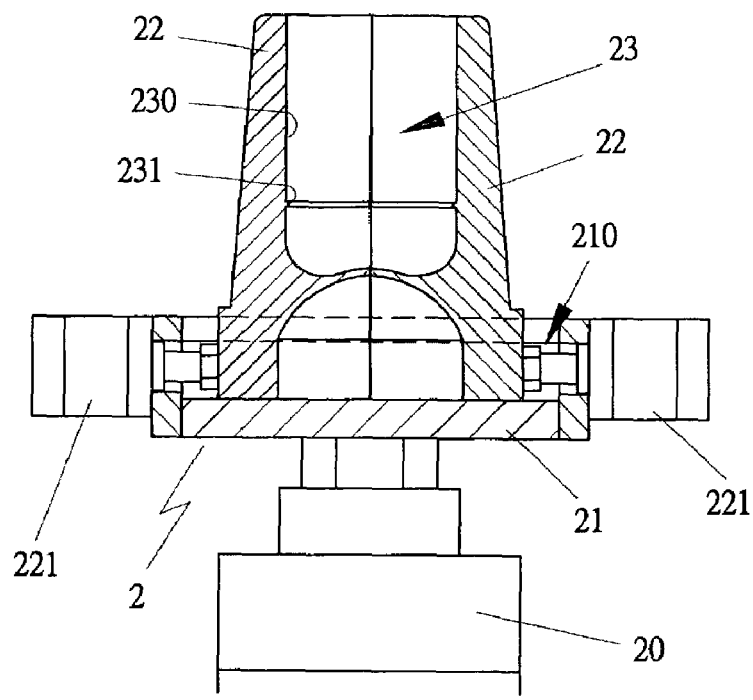
FIG. 10 is a cross-sectional view of the line A—A in FIG. 9.
Figure 11:
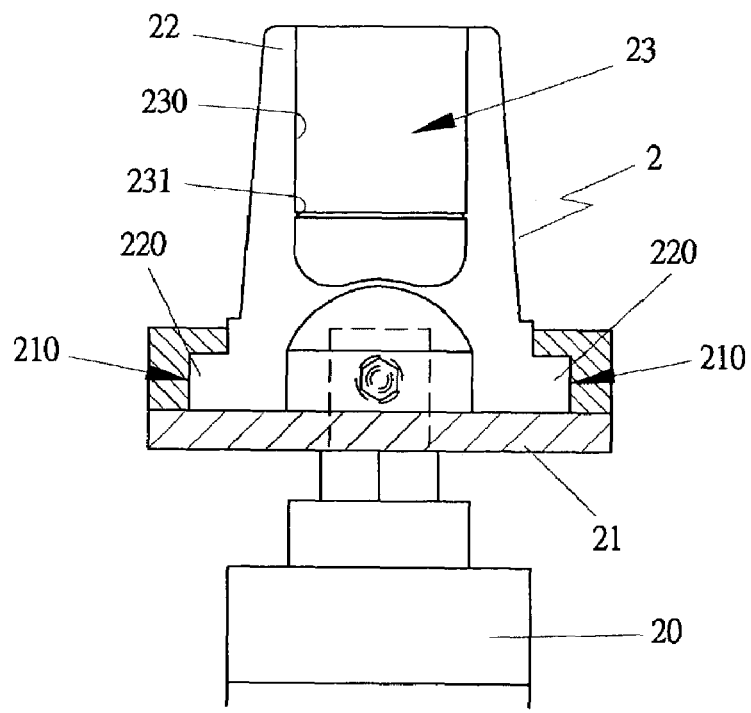
FIG. 11 is a cross-sectional view of the line B—B in FIG. 11.
Figure 13:
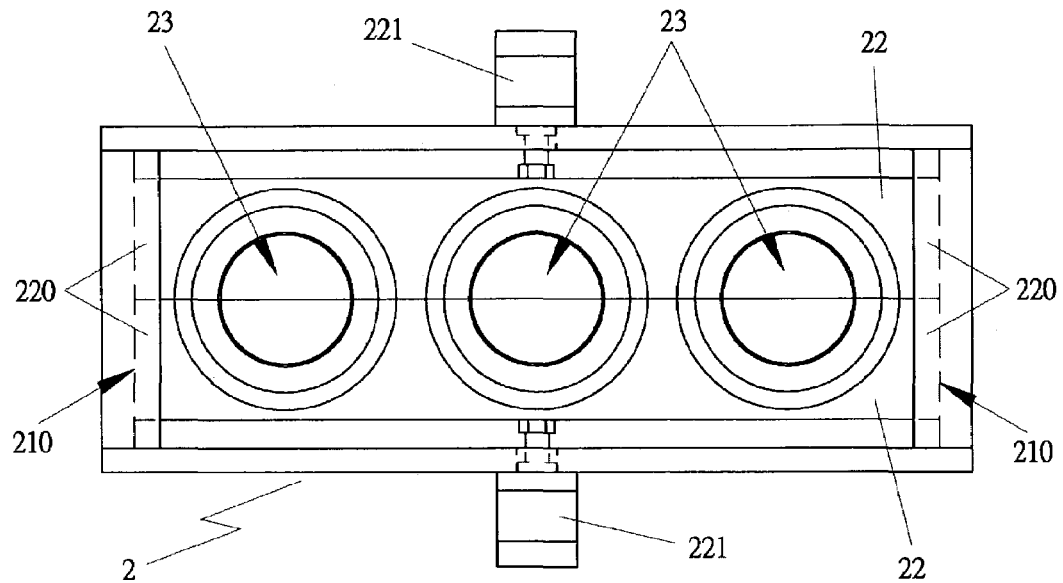
FIG. 13 is an upper view of an inner mold of a third embodiment of an internally label-sticking mold in the present invention.
Figure 14:
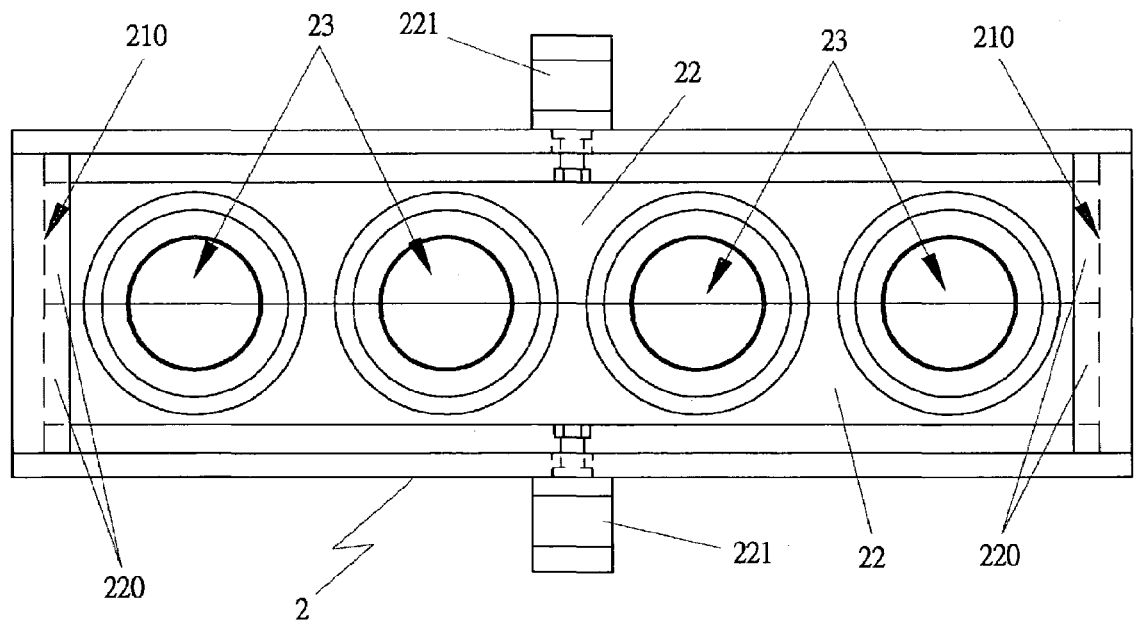
FIG. 14 is an upper view of an inner mold of a fourth embodiment of an internally label-sticking mold in the present invention.

Next, FIGS. 12–14 show a second, a third and fourth embodiment of an internally label-sticking mold respectively modified from the first embodiment, having an inner mold 2 consisting of plural interior hollows 23 for manufacturing plural plastic products at one time of blowing molding process, having the same effect as the first embodiment.

Figure 15:
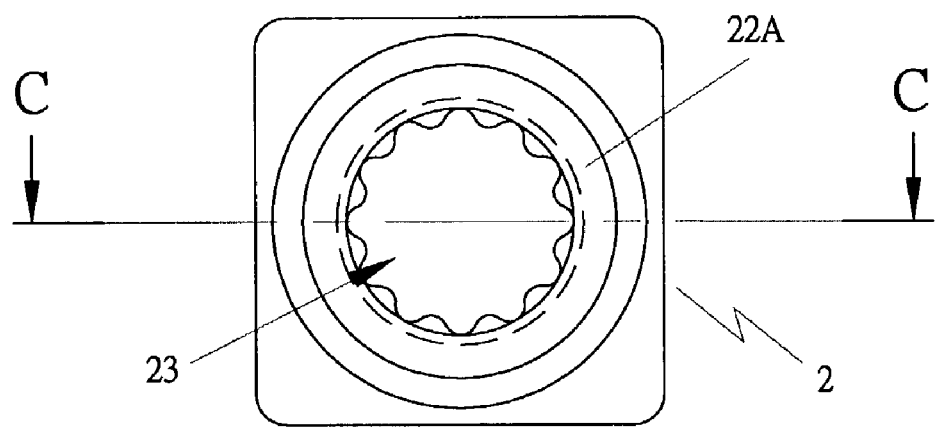
FIG. 15 is an upper view of an inner mold of a fifth embodiment of an internally label-sticking mold in the present invention.
Figure 16:
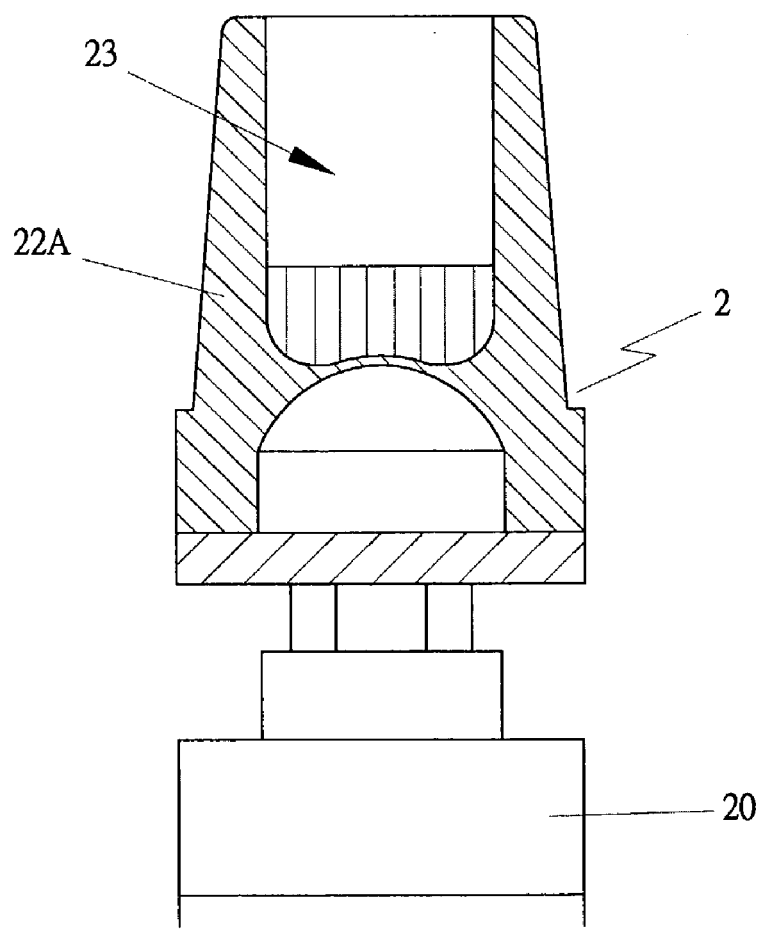
FIG. 16 is a cross-sectional view of the line C—C in FIG. 15.
Figure 17:
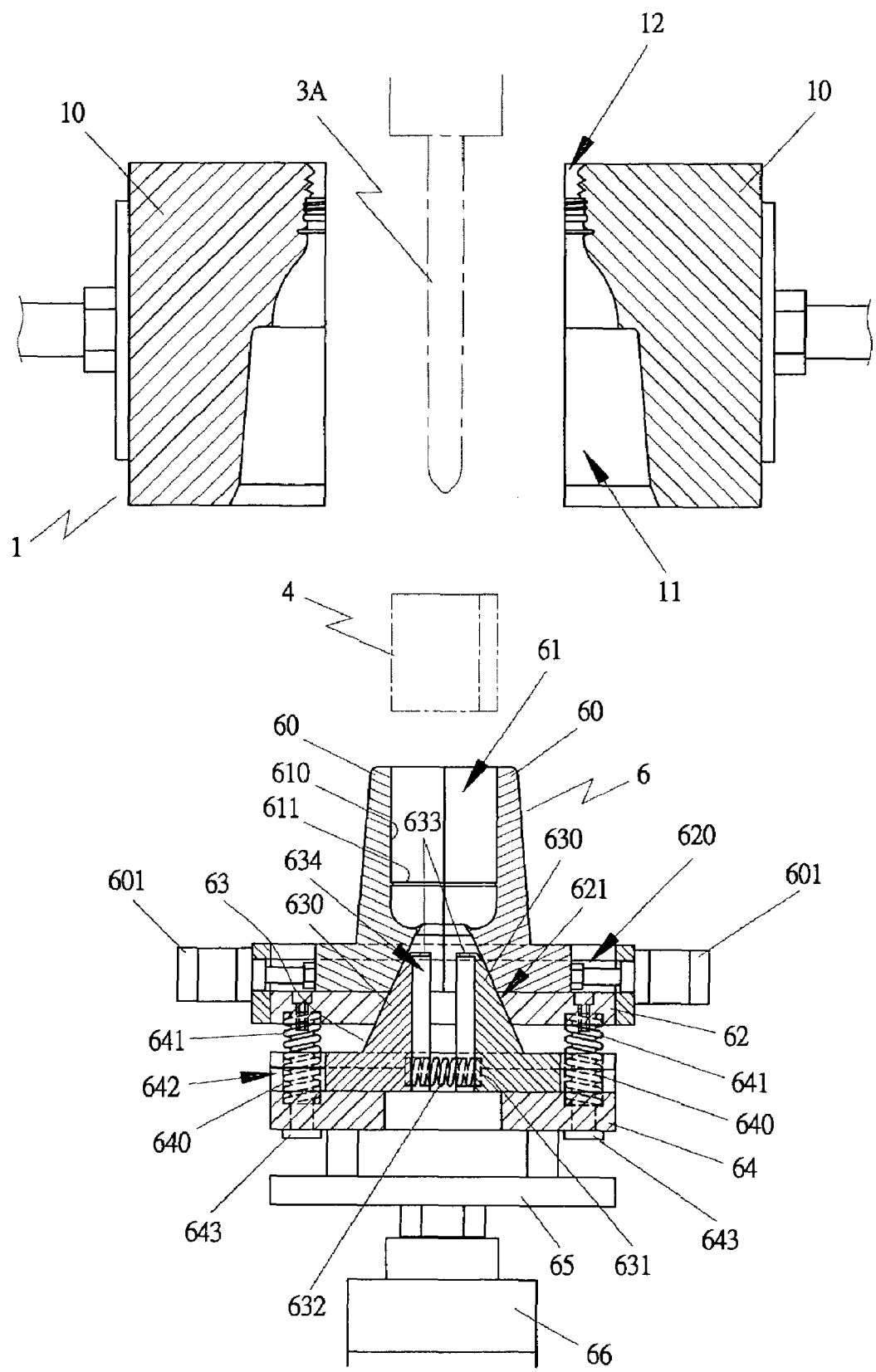
FIG. 17 is an exploded cross-sectional view of a sixth embodiment of an internally label-sticking mold in the present invention.

FIGS. 15 and 16 show a fifth embodiment of an internally label-sticking mold, also modified from the first embodiment and having an inner mold 2 made of a mold block 22A integral, having an interior hollow 23, but not using the drive member 221, having the same effect of the first embodiment.

Further, FIGS. 17–23 show a sixth embodiment of an internally label-sticking mold, including an outer mold 1 and an inner mold 6. The outer mold 1 consists of plural mold blocks 10, which form an interior hollow 11 after combined together. The outer mold 1 also has an inlet 12 for a shaped material 3A to pass through into the interior hollow 11 for easily blowing air to form the material 3A into a finished product 30.

The inner mold 6 can consist of plural mold blocks 60 for enabling various shaped finished plastic products 30 (as shown in FIGS. 18, 19 and 20) more easily taken out of the mold. A slide block member 600 is formed integral in a lower section of each mold block 60. Further a drive member 601 is provided with each mold block 60 to automatically open and close the mold blocks 60 so as to take out finished plastic products. The inner mold 6 has an interior hollow 61 shaped the same as a part of various plastic products 30 to be molded, with an annular wall 611 formed on an inner surface 610 defining the interior hollow 61 for placing a label 4 for limiting the depth of the label placed around the interior hollow 61. Further, an upper mold base 62 is provided for supporting the inner mold 6, having a slide groove 600 for the slide block member 600 of the inner mold 6 to fit with, and a groove 621 for positioning a cone-shaped clamp mold 63 consisting of plural clamp-mold blocks 630 with an outer sloped surface, and a coil spring 632 is placed between the plural clamp-mold blocks 630 for automatically opening and closing the clamp-mold blocks 630 to coordinate with automatic opening and closing movement of the inner mold 6. The upper mold base 32 further has a center hole 621 for the clamp mold 63 to fit therein so that the clamp mold 6 may open or close with a regular route. Further, the clamp mold 63 has a clamping member 633 defining a gap 734 for clamping a lower end of a shaped material 3A, as shown in FIG. 19. The plural clamp-mold blocks 630 have a slide block member 635 formed in a lower section, and a intermediate mold base 64 is provided to support the slide block members 635 of the clamp block 63, having plural holes 640 for springs 641 to extend through, and a slide groove 642 for the slide block members 635 to fit therein, and combined with the upper mold base 62 by means of vertical rods 643. Further, a lower mold base 65 is provided to support the intermediate mold base 64, firmly fixed with the intermediate mold base 64. Then another drive member 66 is provided under the lower mold base 65 to move the inner mold 6 together with the clamp mold 63 and the three mold bases 62, 64 and 65, and it may be an oil pressure cylinder, an air pressure cylinder, a threaded rod moved by a motor or by an oil pressure motor.

In using the sixth embodiment, a material 3A is placed in the outer mold 1, with a label 4 placed in advance in the interior hollow 61 of the inner mold 6. Next, the mold block 10 of the outer mold 1 is closed up, with the inner mold 6 pushed up into the interior hollow 11 of the outer mold 1 by the drive member 66 at the same time. Then the upper end of the material 3A is clamped in the outer mold 1 and the lower end of the material 3A is clamped in the inner mold 6, as shown in FIG. 19. After the material 3A is blown by air coming through the air tube 5 to become a plastic product (bottle), as shown in FIGS. 20–23, the plastic bottle 30 is stuck with the label 4 as integral, resolving the falling-off problem of the label, which often happens in the conventional mold for manufacturing plastic bottles.

Figure 24:
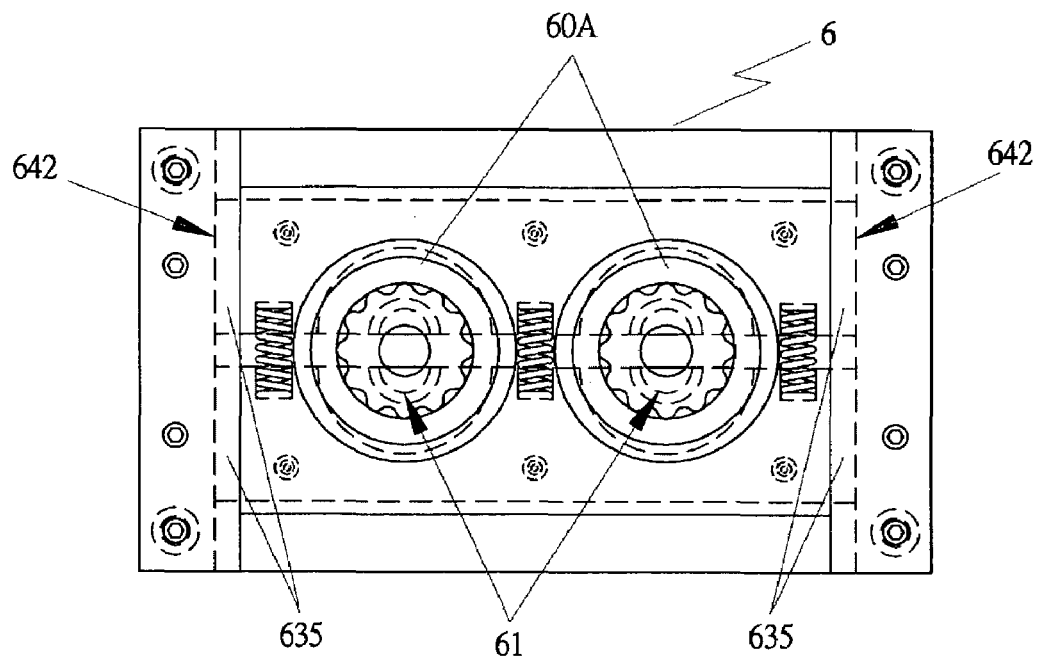
FIG. 24 is an upper view of an inner mold of a seventh embodiment of an internally label-sticking mold in the present invention.
Figure 25:
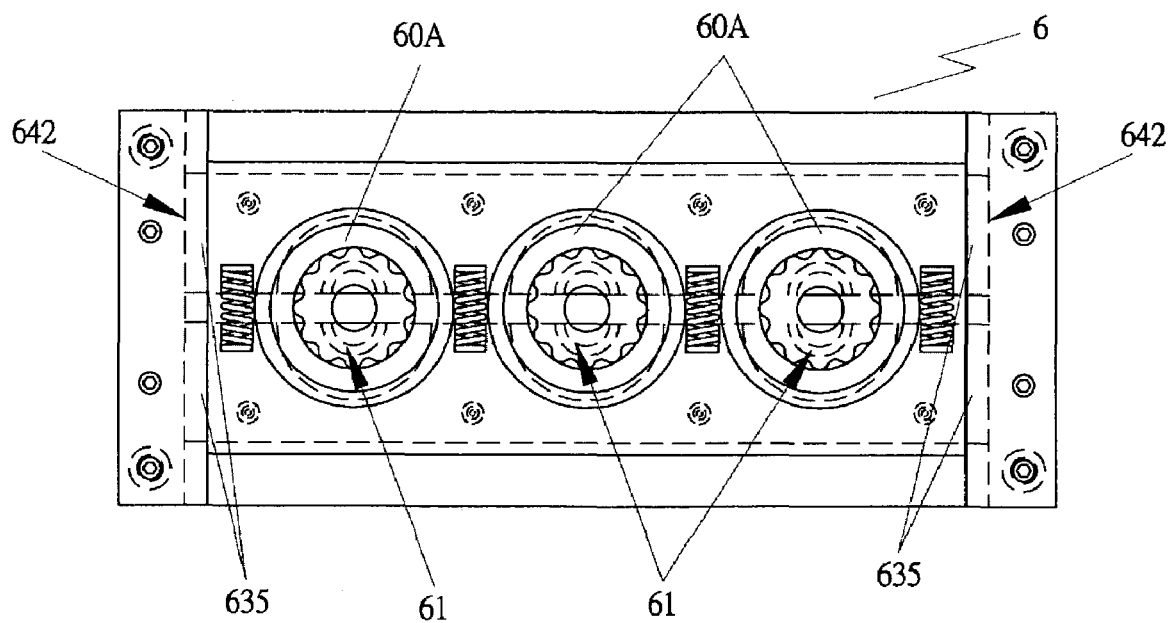
FIG. 25 is an upper view of an inner mold of an eighth embodiment of an internally label-sticking mold in the present invention.
Figure 26:
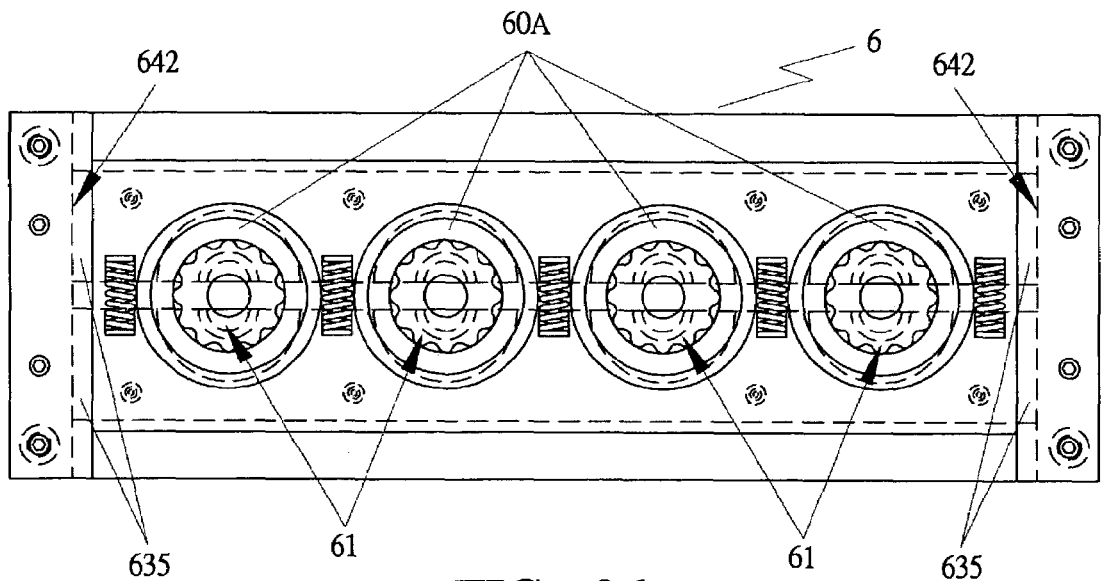
FIG. 26 is n upper view of inner mold of a ninth embodiment of an internally label-sticking mold in the present invention.

Next, FIGS. 24–26 show a seventh, an eighth and a ninth embodiment of an internally label-sticking mold, also modified from the first embodiment, except plural interior hollows 61 provided in the inner mold 6, for molding plural plastic products at one time of molding process of the mold.

Figure 27:
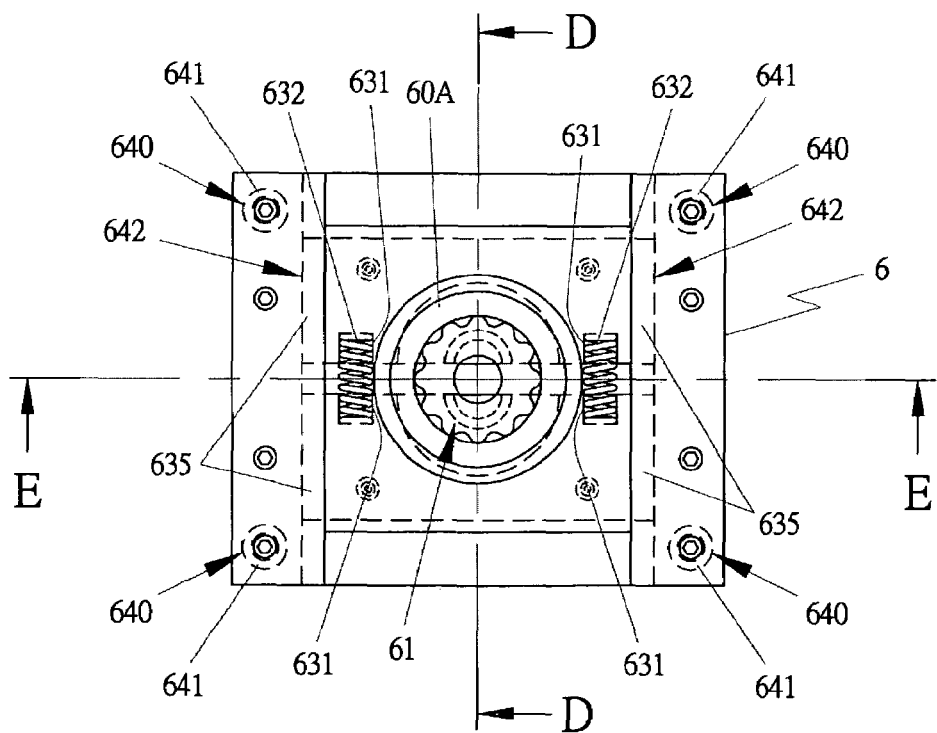
FIG. 27 is an upper view of an inner mold of a tenth embodiment of an internally label-sticking mold in the present invention.
Figure 28:
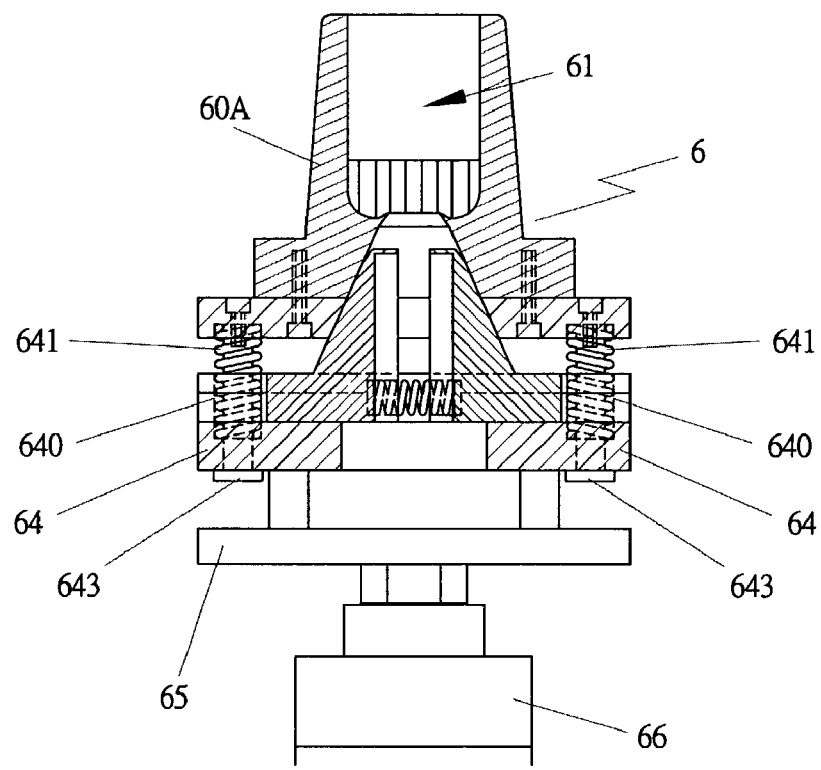
FIG. 28 is a cross-sectional view of the line D—D in FIG. 27.
Figure 29:
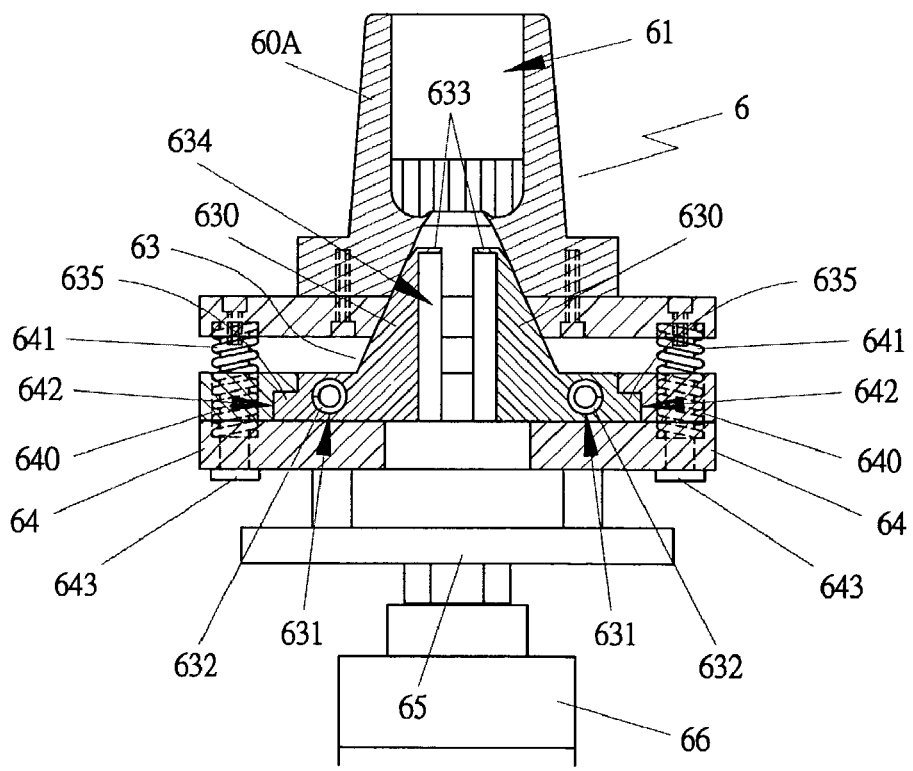
FIG. 29 is a cross-sectional view of the line E—E in FIG. 27.

Further, FIGS. 27–29 show a tenth embodiment of an internally label-sticking mold, modified from the sixth embodiment, differing in an inner mold 6, which is made of one mold block 60A integral, and an interior hollow 61, without using the drive member 601, having the same effect as the sixth embodiment.

While the preferred embodiments of the invention have been described above, it will be recognized and understood that various modifications may be made therein and the appended claims are intended to cover all such modifications that may fall within the spirit and scope of the invention.

What is claimed is:

1. An internally label-sticking mold comprising:
   an outer mold having a first interior hollow for containing an inner mold;
   said inner mold made integral of one mold block having a second interior hollow, an inner surface defining said second interior hollow formed with an annular wall for a label to be placed thereon to limit the depth of the label in said second interior hollow;
   said inner mold combined with said outer mold after a shaped material is placed in the first interior hollow of said outer mold, the shaped material blown to become a plastic product with the label stuck on the plastic product.

2. An internally label-sticking mold comprising:
   an outer mold having an interior hollow, an inlet formed in an upper side of said outer mold for placing a shaped material in said interior hollow of said outer mold;
   an inner mold having plural mold blocks defining an inner hollow shaped as the shape of a plastic product to be molded;
   a first drive member respectively provided at two opposite ends of said mold blocks to open and close said mold blocks for easily taking various shaped plastic product out of the inner mold.

3. An internally label-sticking mold comprising:
   an outer mold having an interior hollow, an inlet formed in an upper side of said outer mold for placing a shaped material into said interior hollow of said outer mold;
   an inner mold having plural mold blocks, a first drive member coupled to said mold blocks to open and close said mold blocks, said inner mold having an interior hollow shaped as the shape of a plastic product to be molded;
   an upper mold base provided to support said inner mold and having a center hole for a cone-shaped clamp mold to fit therein;
   said clamp mold having plural clamp-mold blocks provided respectively with a spring groove for containing a coil spring therein, said clamp mold having a clamp member provided with a gap for catching the shaped material;
   an intermediate mold base provided to support said clamp mold, said intermediate mold base slidably coupled with said upper mold base.

4. The internally label-sticking mold as claimed in claim 3, wherein each of said clamp-mold blocks has a slide block member in its lower section, and said intermediate mold base has a slide groove for the slide block member of said clamp-mold blocks to fit therein.

5. The internally label-sticking mold as claimed in claim 3, wherein said intermediate mold base has plural holes and said upper mold base has plural holes corresponding to the holes of said intermediate mold base, each of said plural holes of said intermediate mold base is aligned with a corresponding hole of said upper mold base forming a pair of matching holes, a coil spring is provided and confined in each said pair of matching holes, a rod is inserted through each said pair of matching holes so as to movably connect said upper mold base and said intermediate mold base.

6. The internally label-sticking mold as claimed in claim 3, wherein said upper mold base has a slide groove, said mold blocks of said inner mold have a slide block member formed in a lower section of said mold blocks respectively, said slide block member is engaged with said slide groove so that said mold blocks of said inner mold are slidably connected to said upper mold base.

7. The internally label-sticking mold as claimed in claim 3, further comprising a second drive member for moving said inner mold up and down.

8. The internally label-sticking mold as claimed in claim 7, further comprising a lower mold base for supporting said intermediate mold base, wherein said lower mold base is fixed with said intermediate mold base and with said second drive member.

9. The internally label-sticking mold as claimed in claim 3, wherein an inner surface of said inner mold is formed with an annular wall for limiting the position of a label placed in said inner mold.

10. An internally label-sticking mold comprising:
    an outer mold having an interior hollow, an inlet formed in an upper side of said outer mold and communicating with said interior hollow for placing a shaped material into said interior hollow;
    an inner mold made of one piece integral, said inner mold having an interior hollow shaped as the shape of a plastic product to be molded, said inner mold having an opening at bottom thereof;
    an upper mold base provided to support said inner mold, said upper mold base having a center hole for a cone-shaped clamp mold to fit therein, said center hole being aligned with said opening of said inner mold;
    said clamp mold having plural clamp-mold blocks provided respectively with a spring groove for containing a coil spring therein, said clamp mold having a clamp member provided with a gap for holding the shaped material protruding from the opening of said inner mold;
    an intermediate mold base provided to support said clamp mold, said intermediate mold base slidably coupled with said upper mold base.

11. The internally label-sticking mold as claimed in claim 10, wherein each of said clamp-mold blocks has a slide block member in its lower section, and said intermediate mold base has a slide groove for the slide block member of said clamp-mold blocks to fit therein.

12. The internally label-sticking mold as claimed in claim 10, wherein said intermediate mold base has plural holes and said upper mold base has plural holes corresponding to the holes of said intermediate mold base, each of said plural holes of said intermediate mold base is aligned with a corresponding hole of said upper mold base forming a pair of matching holes, a coil spring is provided and confined in each said pair of matching holes, a rod is inserted through each said pair of matching holes so as to movably connect said upper mold base and said intermediate mold base.

13. The internally label-sticking mold as claimed in claim 2, further comprising a lower mold base for supporting said inner mold, wherein said lower mold base has a slide groove, said mold blocks of said inner mold have a slide block member formed in a lower section of said mold blocks respectively, said slide block member is engaged with said slide groove so that said inner mold is slidably connected to said lower mold base.

14. The internally label-sticking mold as claimed in claim 13, further comprising a second drive member connected to said lower mold base for moving said inner mold up and down.

15. The internally label-sticking mold as claimed in claim 2, wherein an inner surface of said inner mold is formed with an annular wall for limiting the position of a label placed in said inner mold.

16. The internally label-sticking mold as claimed in claim 2, further comprising a clamp mold positioned under said inner mold, wherein said clamp mold has plural clamp-mold blocks for clamping the shaped material extending from said inner mold through an opening at bottom of said inner mold.

17. The internally label-sticking mold as claimed in claim 1, further comprising a clamp mold positioned under said inner mold, wherein said clamp mold has plural clamp-mold blocks for clamping the shaped material extending from said inner mold through an opening at bottom of said inner mold.

* * * * *